(12) United States Patent
Tehan et al.

(10) Patent No.: US 10,742,163 B2
(45) Date of Patent: Aug. 11, 2020

(54) PORTABLE SOLAR PHOTOVOLTAIC ARRAY

(71) Applicant: 5B IP HOLDINGS PTY LTD, Marrickville, New South Wales (AU)

(72) Inventors: Eden Tehan, Bensville (AU); Christopher McGrath, Bowral (AU)

(73) Assignee: 5B IP HOLDINGS PTY LTD, Marrickville, New South Wales (AU)

( * ) Notice: Subject to any disclaimer, the term of this patent is extended or adjusted under 35 U.S.C. 154(b) by 0 days.

(21) Appl. No.: 15/516,478

(22) PCT Filed: Oct. 5, 2015

(86) PCT No.: PCT/AU2015/050603
§ 371 (c)(1),
(2) Date: Apr. 3, 2017

(87) PCT Pub. No.: WO2016/049710
PCT Pub. Date: Apr. 7, 2016

(65) Prior Publication Data
US 2018/0278201 A1 Sep. 27, 2018

(30) Foreign Application Priority Data
Oct. 3, 2014 (AU) .............................. 2014903954

(51) Int. Cl.
*H02S 30/20* (2014.01)
*H02S 10/40* (2014.01)
(Continued)

(52) U.S. Cl.
CPC .............. *H02S 30/20* (2014.12); *H02S 10/40* (2014.12); *H02S 40/36* (2014.12); *F24S 2030/16* (2018.05)

(58) Field of Classification Search
CPC ...................................................... H02S 30/20
(Continued)

(56) References Cited

U.S. PATENT DOCUMENTS 4,555,585 A * 11/1985 Behrens ................. B64G 1/443
136/245
8,829,330 B2 * 9/2014 Meyer .................... G02B 7/183
136/246
(Continued)

FOREIGN PATENT DOCUMENTS

| CN | 201509167 | 6/2010 |
| JP | S6411373 | 1/1989 |
| WO | WO2011160851 A1 | 12/2011 |

OTHER PUBLICATIONS

International Search Report and Written Opinion for International Appln. No. PCT/AU2015/050603; International Filing Date Oct. 5, 2015; dated Dec. 8, 2015.
(Continued)

*Primary Examiner* — Shannon M Gardner
(74) *Attorney, Agent, or Firm* — Hovey Williams LLP (57) ABSTRACT

A portable PV module array, the modules being connected along adjacent end edges and being foldable relative to each other about the connected end edges between a closed condition and an open condition, whereby: in the closed condition, the PV modules are stacked together in a generally parallel and close facing relationship with the edges of the PV modules in general alignment, and in the open condition, the PV modules are disposed at an angle to each other so that the PV module array defines triangular configuration, and foldable movement of the PV modules from the closed condition to the open condition being restricted against movement beyond the open condition by a flexible connector that connects with a connection point associated with each of the PV modules of the PV module array and
(Continued)

that is tensioned in the open condition and that is slack in the closed condition.

20 Claims, 6 Drawing Sheets

(51) Int. Cl.
    *H02S 40/36*     (2014.01)
    *F24S 30/00*     (2018.01)

(58) Field of Classification Search
    USPC .......................................................... 136/245
    See application file for complete search history.

(56) References Cited

U.S. PATENT DOCUMENTS

| | | | |
|---|---|---|---|
| 9,249,565 B2 * | 2/2016 | Merrifield | E04C 3/005 |
| 2009/0320898 A1 | 12/2009 | Gumm | |
| 2011/0253193 A1 * | 10/2011 | Korman | H01L 31/048 |
| | | | 136/245 |
| 2016/0173025 A1 * | 6/2016 | Baumgartner | H02S 30/20 |
| | | | 136/245 |

OTHER PUBLICATIONS

First Examination Report dated Jan. 14, 2020 in corresponding Indian Application No. 201727012644.

* cited by examiner

PORTABLE SOLAR PHOTOVOLTAIC ARRAY

CROSS-REFERENCE TO RELATED APPLICATIONS

This is a national stage application under 35 U.S.C. § 371 of International Patent Application No. PCT/AU2015/050603, filed Oct. 5, 2015, which claims priority to Australian Application No. AU 2014903954, filed Oct. 3, 2014, the entire disclosures of which are hereby incorporated by reference herein.

TECHNICAL FIELD

This invention relates to portable or redeployable arrays of solar photovoltaic (PV) modules for the purpose of power generation.

BACKGROUND OF INVENTION

Solar PV modules are well known as devices that convert light energy (electromagnetic radiation) directly into usable electric energy via a photoelectric effect. The process of conversion is well known. Solar PV modules can be formed as mountable panels and in that form, the modules have been installed extensively in the domestic and commercial markets, usually on the roofs of domestic dwellings and commercial buildings, to supplement electricity supply from the normal grid supply, or to feed back into the normal grid supply. PV modules comprise a plurality of PV cells that are connected electrically and physically in various configurations to form the PV module (or 'solar panel'), while the module also comprises structural support and environmental encapsulation of the PV cells.

To form a PV system for the purpose of electrical energy generation, PV modules are typically installed on mounting structures and electrically interconnected to form PV arrays, along with other balance of system components (BoS) such as inverters, electrical reticulation, switchgear and protection to complete the system.

PV arrays can be designed and constructed in a variety of ways, however common to all PV arrays is the goal of minimising the cost per unit of energy delivered by the PV system. The two main determinants of the cost of energy from a PV system are capital cost and energy generation.

With the exception of the PV modules themselves, the capital cost of a PV array is driven primarily by the cost of materials in the mounting structure (and therefore the complexity of it) and labour requirements for assembly and installation of the PV array.

In contrast, energy generation from a PV system is highly dependent upon the PV array configuration—that is, the 3D spatial orientation of the modules in the PV array. A PV module generates optimal output when it is positioned at an angle which is normal to the incidence of the sun's rays at any given time. Due to the diurnal and seasonal movement of the sun, this results in the modules of a PV array being either mounted on a structure which tracks the path of the sun diurnally and/or seasonally to achieve optimal generation most or all of the time, or otherwise the modules are fixed at a tilt and orientation which in a compromise, nevertheless achieves the maximum possible annual generation without tracking.

PV arrays that are installed to track the path of the sun include dual axis tracking PV arrays (which track diurnally and seasonally) which have the highest capital cost but the highest generation yield, single axis inclined tracking (which track diurnally but not seasonally), and single axis horizontal tracking (which also track diurnally but not seasonally). Non tracking PV arrays are fixed arrays which provide the lowest cost but also lowest energy generation. These include flat arrays, whereby the modules are laid out in a planar configuration and more recently, East-West (EW) PV arrays (which are a subset of fixed PV arrays).

Tracking PV arrays seek to increase the energy yield of a PV array by ensuring the PV modules are orientated as close to an angle normal to the radiation of the sun as possible at any given time. This is achieved by a mechanical (or sometimes hydraulic) mounting structure which moves the PV modules in one or two axis over the course of the sunlight hours.

A fixed PV array currently represents an effective compromise of cost, complexity and operational risk of the PV array with energy generation. In a fixed PV array the PV modules remain fixed for the life of the PV system, therefore an orientation must be chosen which achieves the maximum generation possible from the fixed PV array in the absence of tracking. The orientation of the PV array (including the tilt angle) is often dictated by the structure to which the PV array is fixed. As this is often a roof, often the orientation is not optimal depending on which way the roof faces and the incline of the roof.

An EW configuration essentially splits a planar PV array into two sub-arrays of PV modules, one sub-array orientated towards the east and the other sub-array orientated towards the west. The modules can be arranged in rows, or in end-to-end connection or alignment, with each row arranged as a series of successive triangles each made up of one east-facing and one west-facing module. An EW PV array achieves a capital cost lower than a fixed PV array, due to reduced structural requirements (due to lower wind loadings and more integrated structure), reduced foundation requirements, and reduced array footprint. The downside though is the reduced energy generation due to the non-optimal fixed orientation. Until recently, the cost benefit of the reduced structural requirements did not justify the reduced energy generation, however as PV module cost continues to fall, this balance has changed and in certain applications the EW approach can result in a lower cost of energy than conventional fixed PV arrays.

Given the improving attractiveness of the EW PV array, the present invention is directed to that form of PV array.

Pre-assembled PV arrays have advantages in relation to reduced installation labour and construction timeframe requirements, while portable PV arrays enable use of PV systems in shorter term applications at different locations. Currently, two groups of PV arrays exist that could be described as pre-assembled or portable PV systems.

The first is a collection of low-voltage portable systems designed for use whilst camping, in military exercises, or essentially anywhere where temporary or short term energy generation is required. These systems typically are of small power generation capability, physically small and have the PV modules oriented on a single plane to maximize energy yield (i.e not EW configuration). This group of products is largely irrelevant to the present invention.

The second group of products, which are more relevant to the invention, are larger scale pre-assembled PV arrays that include a folding structure to enable the PV array to be portable. These systems are typically more expensive than a conventional fixed or EW PV array and have PV modules mounted to a complex sub-structure which includes articulated joints for unfolding the array of modules. These systems are planar systems rather than EW systems.

Portable systems of the second group of products are costly and therefore do not provide low cost of energy. They are therefore typically only used in bespoke applications which can justify the added cost necessary to achieve the desired portability of the PV system.

It is the aim of the present invention to provide a portable PV module array that employs an EW PV array in an operational configuration and that has cost and/or installation benefits compared to present portable PV arrays.

SUMMARY OF INVENTION

In accordance with one embodiment of the invention, there is provided a portable PV array comprising:
- at least two planar PV modules which are of generally square or rectangular configuration so that each module defines a generally square or rectangular edge of substantially the same dimensions and comprising a pair of substantially parallel end edges and a pair of substantially parallel side edges,
- the modules being connected along adjacent end edges and being foldable relative to each other about the connected end edges between a closed condition and an open condition, whereby:
- in the closed condition, the modules are stacked together in a generally parallel and close facing relationship with the edges of the modules in general alignment, and
- in the open condition, the modules are disposed at an angle to each other so that the PV module array defines triangular configuration, and
- foldable movement of the PV modules from the closed condition to the open condition being restricted against movement beyond the open condition by a flexible connector that connects with a connection point associated with each of the modules of the module array and that is tensioned in the open condition and that is slack in the closed condition.

The present invention provides a portable PV module array that can be stored and transported in the closed condition, and can be erected into the open condition for use in a suitable location. The portability of the PV module array is beneficial for permanent installations, as the array can be preassembled at the point of manufacture and installed easily at the point of installation, or the array can be one which is commissioned and decommissioned on a regular or semi-regular basis. That is, the array could be installed for temporary use at one location, then either returned to a storage location, or transported to a new location. In each case, the PV array can be shifted from the open condition to the closed condition for transport either back to the storage location or to the new location at which it is to be installed. Upon arrival at that new location, the array can be shifted from the closed condition to the open condition and connected for electricity generation and use.

An important feature of a PV array is the flexible connection that restricts the extent to which the PV modules can open relative to one another. The extent which the modules can be opened is limited by the point at which the flexible connector becomes tensioned or taut. Once the flexible connector has reached that state, then no further unfolding movement between the two modules of the PV array can take place. Accordingly, the maximum open angle between the PV modules of the PV array can be set at the point of manufacture of the PV array, so that upon installation of the PV array at an installation site, there is no necessity for installation personnel to set the angle between the PV modules. Rather, the angle is pre-set as discussed above by the position at which the flexible connector becomes tensioned.

In an alternative arrangement, the flexible connector could be adjustable, to adjust the angle between the PV modules and the flexible connector could include markings in order to identify the angle which exists between the PV modules at a particular length setting of the flexible connector. The flexible connector could, for example, include a threaded adjuster that allows the connector to be shortened or lengthened and thus allows the angle between the PV modules to be decreased or increased.

Other forms of adjustment are equally applicable, such as the use of a lockable cleat or the like, through which the flexible connector extends.

The flexible connector can be made of any suitable material such as, steel wire or cable, other metal wire or cable, synthetic, plastic or rubber cord, rope, or fabric, in the form of a fabric tether. The preference is that the flexible connector be flexible but substantially inelastic or inextensible.

The use of a flexible connector advantageously can significantly reduce the structure required to position the PV modules as required in an EW orientation. Prior art arrangements include costly and heavy structures which are largely omitted in the present invention. Moreover, the flexible connector provides a simple mechanism by which the PV modules can be folded between the closed and open conditions, which advantageously in some forms of the invention, can be a manual operation principally as a result of the use of the flexible connector.

The flexible connector can be left loose or slack when the PV modules are in the closed condition, or the connector can be supported so that it is retained relative to the modules in a specific position. In some arrangements, the connector might be adhered, such as by an adhesive tape, to a proximate surface of the PV modules, so that the connector is neatly stored during storage and transport of the PV array. The tape might be allowed to fail during folding movement of the PV modules to the open condition.

In other forms, clips might be provided into which the flexible connector can be secured, again for the purpose of securing the flexible connector during storage and transport. The clips could be attached to structural parts of the PV modules. Still further, a spring arrangement can be provided whereby the connector extends through or is otherwise connected to a spring that is attached to either a PV module, or to a connector between the modules, with the arrangement being such that as the modules move to the open condition, the spring extends as the flexible connector goes into tension. Conversely, as the modules are shifted from the open condition to the closed condition, the spring retracts, lifting the flexible connector upwardly and securing the connector for storage and transport.

The connection of the modules along adjacent end edges can be by any suitable manner. The connection must allow movement of the modules relative to one another between the closed and open conditions, but this could be achieved in any suitable manner, such as by a flexible plastic, rubber or fabric hinges, or by a standard metal hinge which comprises two parts that are separately connected to the facing end edges of adjacent PV modules and a pin that extends between the parts and allows them to pivot relative to one another in a hinging manner. The connection could alternatively be simply by rope, cable or chain. Clearly, the invention embodies any suitable connection that allows the required relative movement between the modules to go from the closed condition to the opened condition.

It is also within the scope of the invention that the connections between end edges of modules differ. This will be the case when the PV array comprises a greater number than the minimum number of two modules which are connected end to end, such as four modules or greater. In that arrangement, the modules will form a series of alternative peaks and troughs and it is within the scope of the present invention that the connectors which are formed at the peaks between adjacent end edges, are different to the connections that are formed at the troughs. One reason for this is that it is advantageous for the flexible connector to connect to the PV array via connections made at the troughs of the modules, so that the connector is adjacent the surface on which the array is mounted in an open and installed condition. For this, the connectors at the troughs can include facility to connect to the flexible connector whereas the connectors at the peaks do not need that facility.

It is to be noted that the flexible connector can connect to a connection point at any point or part of the modules, and so for example, the connection point could be a connection made to the modules at the peaks, but only where a greater number than two modules forms the PV array, or the connection could be made intermediate the peaks and troughs. A connection point remote from or spaced from the peak can be made in a PV array that comprises just two PV modules, or in a PV array comprising a greater number of PV modules, the connection point can be made intermediate the peaks and the troughs of the PV array.

The connection points can thus be formed on side edges of the modules, or on the connectors that are provided at the peaks or troughs of a module array, or at any other suitable point. The connection points can be inboard of side edges of the modules, such as mid-way between the side edges, or can be external to the side edges.

Moreover, it is within the scope of the invention to connect rows of PV modules to adjacent rows of PV modules to broaden the area of the PV array. Thus lateral connection of one row of PV modules to an adjacent row of PV modules or lateral connection of multiple rows of PV modules is within the scope of the invention. In these arrangements where the PV array includes multiple rows of modules that are connected together along adjacent side edges, it is only necessary for the outermost row of modules to be connected by a flexible connector, rather than all of the rows of modules having a flexible connection. In this respect, a PV array according to the invention can include an initial array comprising a row of at least two modules that are connected at end edges, and duplicate rows of arrays can be connected to side edges of the initial array. The rows of the array can include any number of modules connected at end edges and any number of rows of modules can be connected laterally. In that arrangement, only a single flexible connector need be applied to one row of modules between opposite ends of the row, while the adjacent rows do not require a separate flexible connector. Of course further flexible connectors can be provided as desired for structural integrity. In some arrangements, each of the outermost rows can include a flexible connector, while the interior rows will not include a flexible connector.

The flexible connector can advantageously be used to earth the PV modules and this can be by extending a cable from a module into connection with the flexible connector 22. In this arrangement, the flexible connector is a conductive connector, such as steel or other metal wire or cable.

The invention extends from a minimum of two PV modules to a greater number. In use, a plurality of PV module arrays that comprise only two PV modules can be assembled together to form a greater overall PV array, and in such an arrangement, the individual two PV module arrays can be assembled into an array without connection together, or they can be connected to each other on site. In this latter arrangement, the PV modules can be manufactured with connectors along the free end edges, ie those edges that are spaced from or remote from the edges of the PV modules at the apex that are connected together, or the PV modules can be manufactured with connectors along the side edges, so that on site connection between the individual PV arrays can be made. These connections could be of any suitable form and could be very simple, such as a pin connection, whereby a pin is connected to one edge of one PV module and a sleeve or tube is connected to another PV module so that insertion of the pin into the sleeve is sufficient to connect the PV modules of the individual PV arrays together temporarily.

The invention extends to greater number of PV modules that are connected in rows or end-to-end along end edges and arrays of six, eight, ten or more PV modules connected in rows is contemplated as being appropriate in the present invention. The number of PV modules per PV array will be limited by the bulk of the PV array in the closed condition given that transport vehicles will have an upper size or weight restriction, but multiple vehicles can transport multiple PV arrays so that the overall size of the array can increase to whatever size is required.

BRIEF DESCRIPTION OF DRAWINGS

In order that the invention may be more fully understood, some embodiments will now be described with reference to the figures in which.

DETAILED DESCRIPTION

Figure 1:
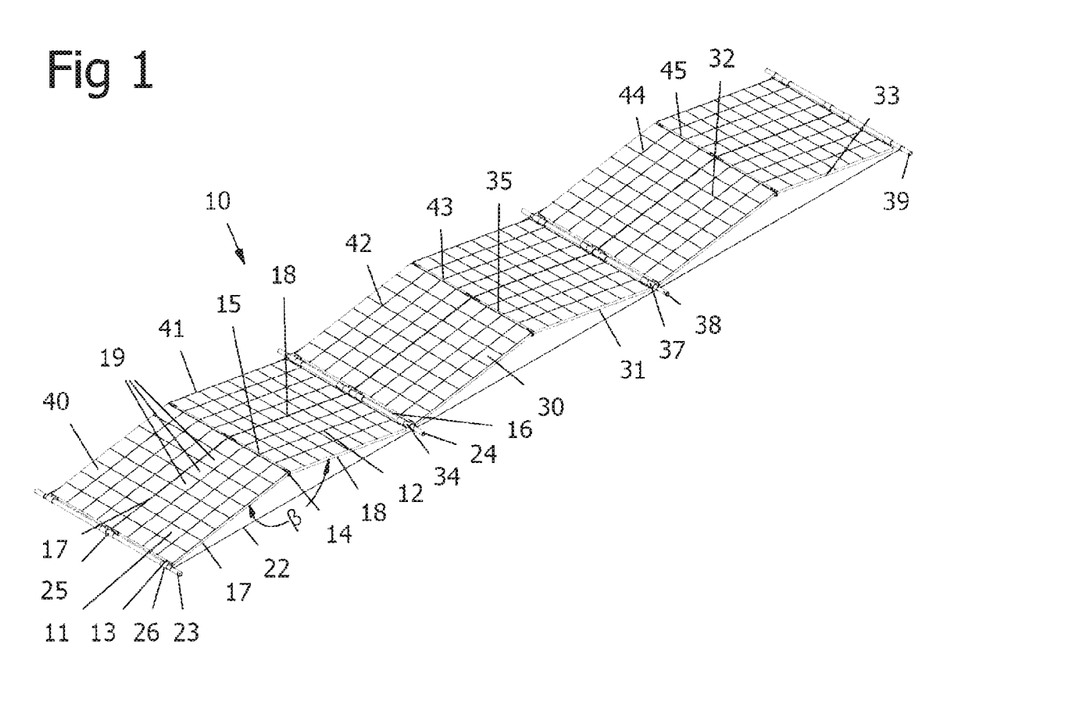
FIG. 1 is a perspective view of a portable PV array in an open condition.

FIG. 1 is a perspective view of a portable PV array 10 according to one embodiment of the invention and is shown in an open or operational condition in which modules of the array are disposed in a triangular configuration to form an EW array of the kind described above.

The array 10 includes a first planar PV module 11 and a second planar PV module 12. All of the modules described herein will have the same construction which is rectangular and planar. The first and second modules 11 and 12 form part of a greater or larger PV array 10, but discussion will firstly focus on the modules 11 and 12 only.

Each of the modules 11 and 12 are of rectangular configuration, so that each defines a generally rectangular edge, the dimensions of which are about the same for each module 11 and 12. The edges comprise a pair of substantially parallel end edges 13 and 14 of the module 11 and end edges 15 and 16 of the module 12, and side edges 17 and 18. It can be seen, in particular with respect to the module 11, that the modules comprise a grid or matrix of PV cells 19.

Figure 2:
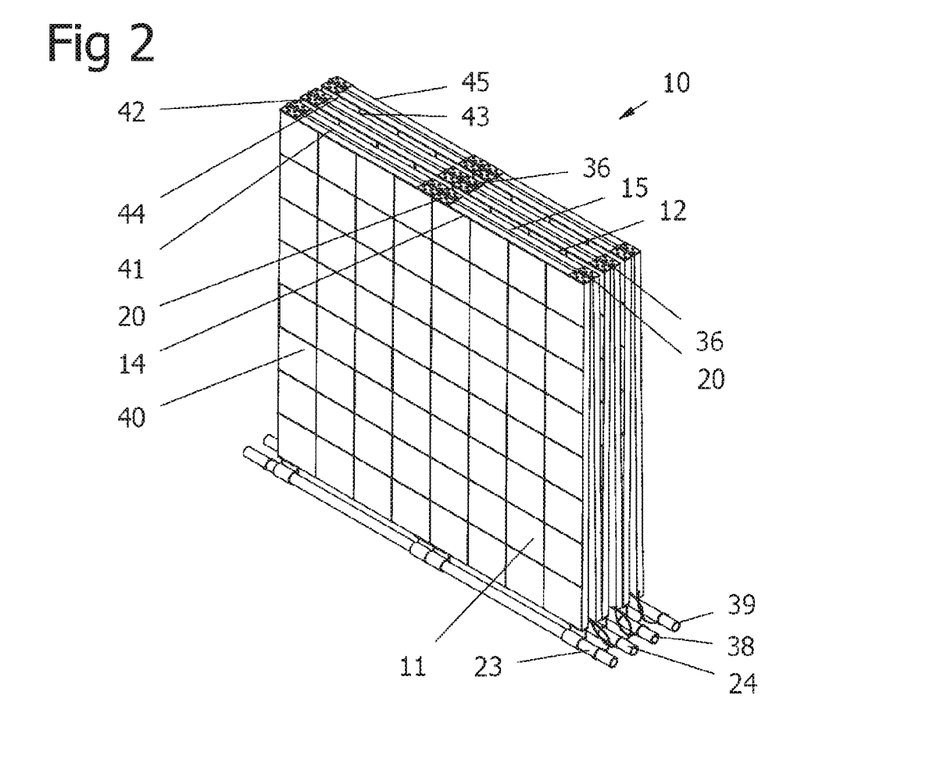
FIG. 2 is a view of the portable PV array of FIG. 1, but in the closed position.

The modules 11 and 12 are connected along facing or adjacent end edges 14 and 15. In the arrangement of FIG. 1, the edges 14 and 15 are connected via a hinge arrangement, which is better seen in FIG. 2. FIG. 2 is a view of the PV array 10 but shown in a closed or stacked condition as would be adopted for storage or transport of the array 10. In FIG. 2, hinges 20 can be seen connecting the end edges 14 and 15 of the modules 11 and 12 together.

FIGS. 1 and 2 thus show the array 10 in both the open (FIG. 1) and the closed (FIG. 2) conditions. As will be evident from FIG. 2, in the closed condition, the modules 11 and 12 are stacked together in a generally parallel and close facing relationship, with the end and side edges of the modules 11 and 12 in general alignment.

In relation to FIG. 1, the modules 11 and 12 are disposed relative to one another at an angle β, which in FIG. 1 is in the region of about 160°. The angle could of course be different to this and can be altered by the length of connector 22 extending between the bars 23 and 24. It is evident from FIG. 1, that in the opened condition, the modules 11 and 12 define a triangular configuration. This thus forms the modules 11 and 12 in an East-West configuration which has advantages compared to planar PV arrays as discussed above.

The transition of the modules 11 and 12 from the closed condition of FIG. 2 to the open condition of FIG. 1 is via folded or hinged movement about the end edges 14 and 15 of the modules 11 and 12, facilitated by the hinges 20. That folding movement could continue until the modules 11 and 12 arrived at a flat or planar condition relative to each other, except that the array 10 includes a flexible connector that connects with connection points associated with each of the modules 11 and 12 and that is tensioned in the opened condition as shown. It is the flexible connector that prevents the modules 11 and 12 from unfolding all the way to a flat or planar condition and which thus maintains the modules in the triangular configuration shown in FIG. 1.

Figure 4:
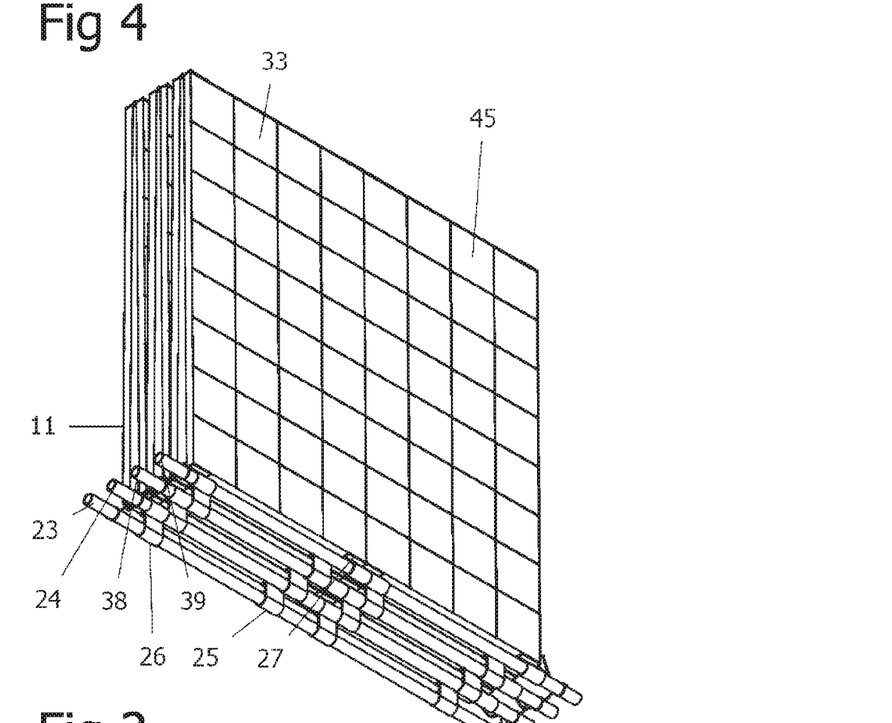
FIG. 4 is an underneath perspective view of the PV array shown in FIG. 2.
Figure 5:
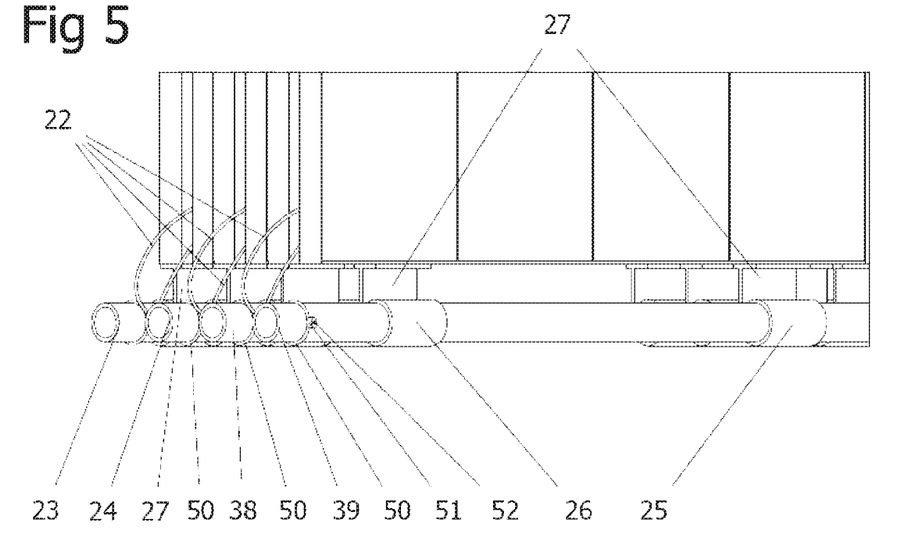
FIG. 5 is a view of the bottom section of the PV array shown in FIGS. 2 and 4.

In FIG. 1, the connection points associated with each of the modules 11 and 12 are tubes, bars or posts 23 and 24, that extend parallel to the end edges 13 and 16 of the respective modules 11 and 12. The bars 23 and 24 are connected to the end edges 13 and 16 via a pair of sleeves 25 and 26 at each of the end edges 13 and 16 and as can be seen in FIG. 1. The sleeves 25 and 26 are also seen in FIGS. 4 and 5 and those figures also show that the sleeves connect to the end edge of the modules via brackets 27. The brackets can be fixed to the end edges by screws for example. The bars 23 and 24 extend beyond the side edges 17 of each of the modules 11 and 12 for connection of the flexible connector 22. FIG. 4 is an underneath perspective view of the PV array shown in FIG. 2 which shows that extension while FIG. 5 also shows the extension.

It will be appreciated that as the modules 11 and 12 are folded and expanded from the closed condition of FIG. 2 to the open condition of FIG. 1, that the flexible connector 22 will remain slack until the modules 11 and 12 reach the angled positioned shown in FIG. 1. At that point, the flexible connector will be tensioned and taut and will prevent further unfolding movement between the modules 11 and 12. The modules 11 and 12 are thus fixed in the open or operational position shown in FIG. 1 against further unfolding movement.

The discussion above in relation to FIGS. 1 and 2 has been made in relation to modules 11 and 12 only. Accordingly, it is within the scope of the present invention to provide a portable PV array which comprises just two modules, equivalent to modules 11 and 12, with a single flexible connector being provided to limit or restrict movement of the modules 11 and 12 just to the open position and not beyond that position. However, it will be clearly evident from FIGS. 1 and 2 that PV arrays which include greater number of PV modules are within the scope of the present invention. For example, further PV modules 30 to 33 can be provided to extend the PV array to form an elongate row of PV modules so that the PV array defines a series of alternating peaks and troughs. In FIG. 1, the modules 11, 30 and 32 could be east-facing modules, while the modules 12, 31 and 33 could be west-facing modules.

In FIG. 1, the modules 30 to 33 repeat the connection arrangement of the modules 11 and 12, so that the end edge 16 of the module 12 and the end edge of 34 of the module 30 connect via the bar 24. Moreover, the facing end edges of the modules 30 and 31 which are located at the peak 35 are connected by hinges 36 (see FIG. 2) which are the same as the hinges 20.

Likewise, the end edges of the modules 31 and 32 which are in facing relationship at the trough 37 are hingedly connected by the bar 38 and this form of connection at the respective peaks and troughs is repeated throughout the length of the PV array. While the array 10 is shown to have six modules, 11, 12 and 30 to 33, any number of modules could be connected in the manner shown and described, so that arrays of eight, ten or greater numbers of modules, connected end to end or in rows, can be provided.

It is to be noted that the hinges 20 and 36 which are described in relation to FIGS. 1 and 2 could be employed rather than the bars 23, 24 and 38, or alternatively, that the hinges 20 and 36 could be replaced by bars which are of the same configuration and connection as the bars 23, 24 and 38. The provision of the bars 23, 24 and 38 is to provide connection for the flexible connector 22, and as shown in FIG. 1, that connector extends from the bar 23, in connection with the bars 24 and 38, and finally to the bar 39.

Moreover, the bars 23, 24, 38 and 39 also assist the provision of a second and additional PV module to be placed or connected laterally side by side the modules 11, 12 and 30 to 33 as described above. Again, with reference to FIGS. 1 and 2, further modules 40 to 45 can be included in the PV array 10 to increase the surface area of the array 10 and common connections to the earlier modules described above can be made via the bars 23, 24, 38 and 39. The bars 23, 24, 38 and 39 can extend fully from one side of the PV modules comprising modules 11, 12 and 30 to 33, to the other side of the modules 40 to 45, or separate bars could extend through the respective rows of PV modules and be connected at free ends at the junction between facing side edges of the PV modules.

Figure 3:
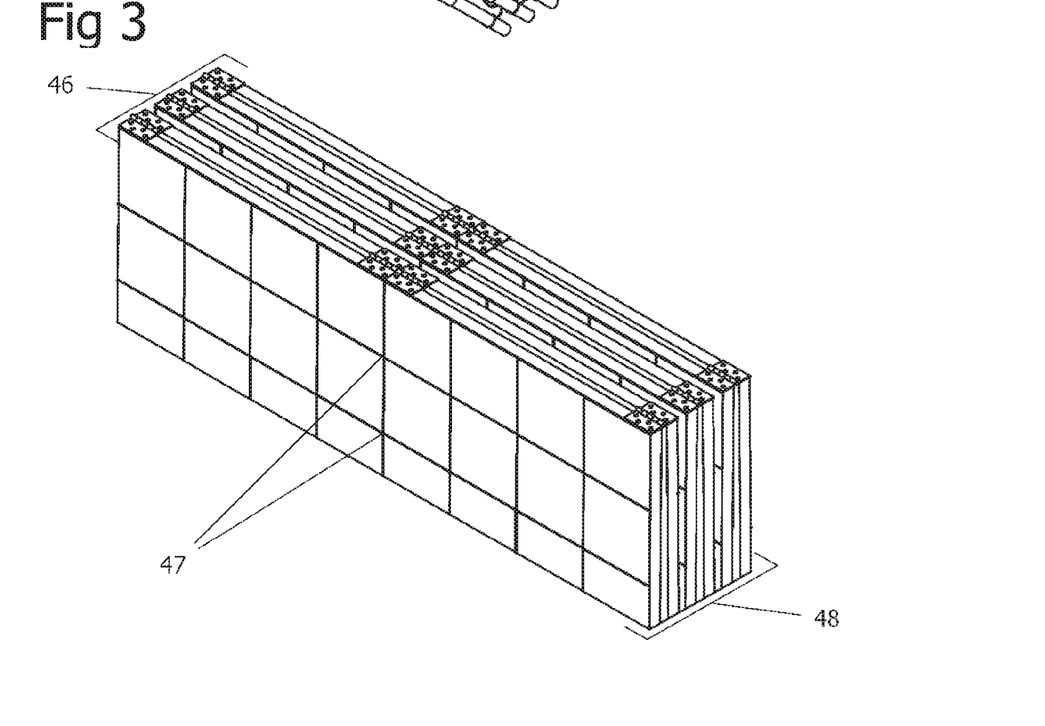
FIG. 3 is a further view of a portable PV array in the closed condition.

The modules 40 to 45 are not required to be connected to the modules 11, 12 and 30 to 33, although connections can be made if desired. For example, facing side edges of the modules 11 and 40 can be connected, while the hinges 20 formed at the facing end edges 14 and 15 of the modules 11 and 12 can be modified for connection with the facing end edges of the modules 40 and 41. FIG. 3 illustrates this form of arrangement, whereby a stack of modules 46 is connected via fixed connectors 47 to an adjacent stack of modules 48. However, as shown in FIG. 2, the modules need not be connected to the modules 11, 12 and 31 to 33, other than through the bars 23, 24, 38 and 39. Moreover, the modules 40 to 45 can simply be placed next to the modules 11, 12 and 31 to 33 and have no connection at all between them. The benefit of connecting the modules in the PV array shown in FIGS. 1 and 2 is that movement between the open and closed conditions is quicker that two separate rows of modules.

In the arrangements discussed above, the flexible connector 22 can extend continuously between the bars 23 and 39, or separate connectors can extend between adjacent bars, such as between bars 23 and 24 and then separately between bars 24 and 38 and bars 38 and 39. FIG. 5 is a view just of the bars 23, 24, 38 and 39 of the array 10, shown in the closed condition of FIG. 2. In that position, loops 50 can be seen extending about each of the bars, and these include a crimp connection 51 by which opposite ends of discreet lengths of the flexible connector 22 can be connected. In FIG. 5, a portion of the connector 22 which extends between the bars 23 and 24 is shown, while the same reference number is used to show flexible connector sections extending between the bars 24 and 38 and 38 and 39.

What is also shown in FIG. 5 is a short section of a further flexible connector, given the reference number 52 and this would extend from the bar 39 to a further bar which is not shown in the figures, if the array 10 included further PV modules extending from the last illustrated module 33.

It is clear that other arrangements could be employed for securing the flexible connector to the respective bars of the array 10. In one arrangement which is not illustrated, the flexible connector 22 could extend through the respective bars of the array 10 and a grub screw could be screwed into engagement with the connector within the bars so as to locate the connector relative to the bars.

Figure 10:
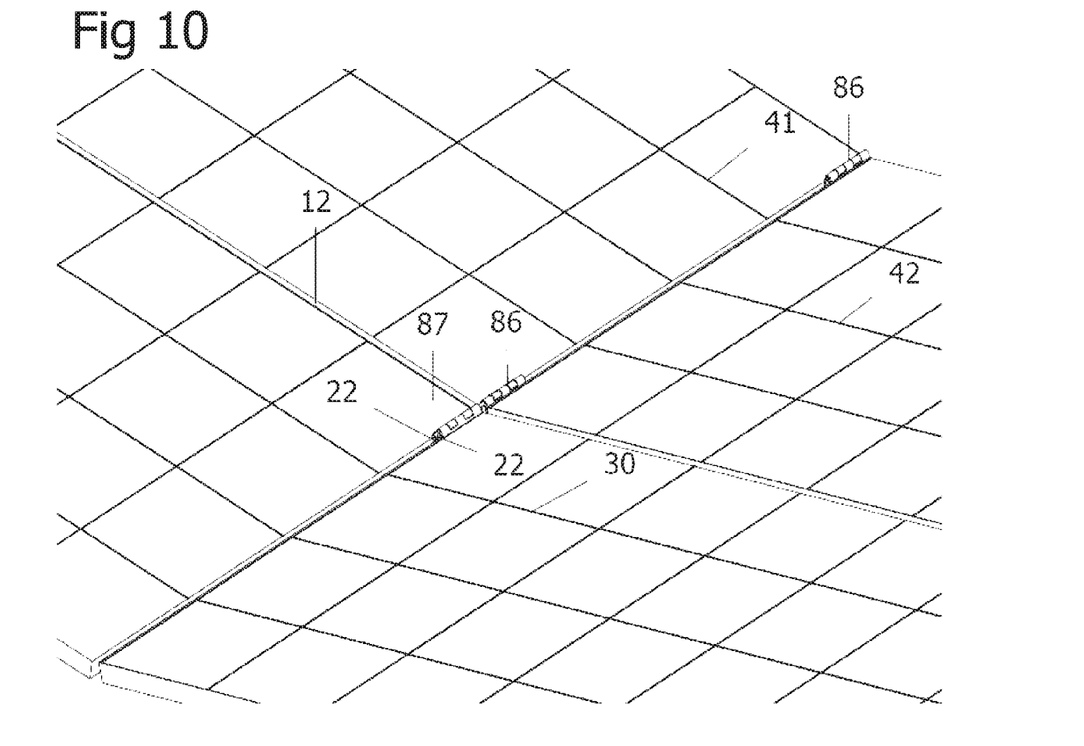
FIG. 10 is a view of the trough between a pair of PV modules and showing a hinge arrangement that supports a flexible connector.

Alternatively, the flexible connector 22 could cooperate with a hinge that is provided at the junction between adjacent PV modules at the trough between those modules, and FIG. 10 illustrates the PV modules 12 and 30, and 41 and 42 of the array 10 with an example alternative arrangement applied. In the illustrated arrangement two hinges 86 are illustrated. In the foreground hinge, the flexible connector 22 is shown extending up between the junction of the PV modules 12 and 30 and the through the bolt 87 that extends through the hinge 86. An opening is formed in the shank of the bolt 87 for passage of the flexible connector 22.

While not visible in FIG. 10, the bolt 87 also includes a threaded bore or opening through the shank of the bolt laterally to the opening through which the flexible connector 22 extends and a grub screw can be is screwed into the threaded opening and into engagement with the portion of the flexible connector 22 within the opening. By this arrangement, the position of the flexible connector 22 can be secured.

Figure 11:
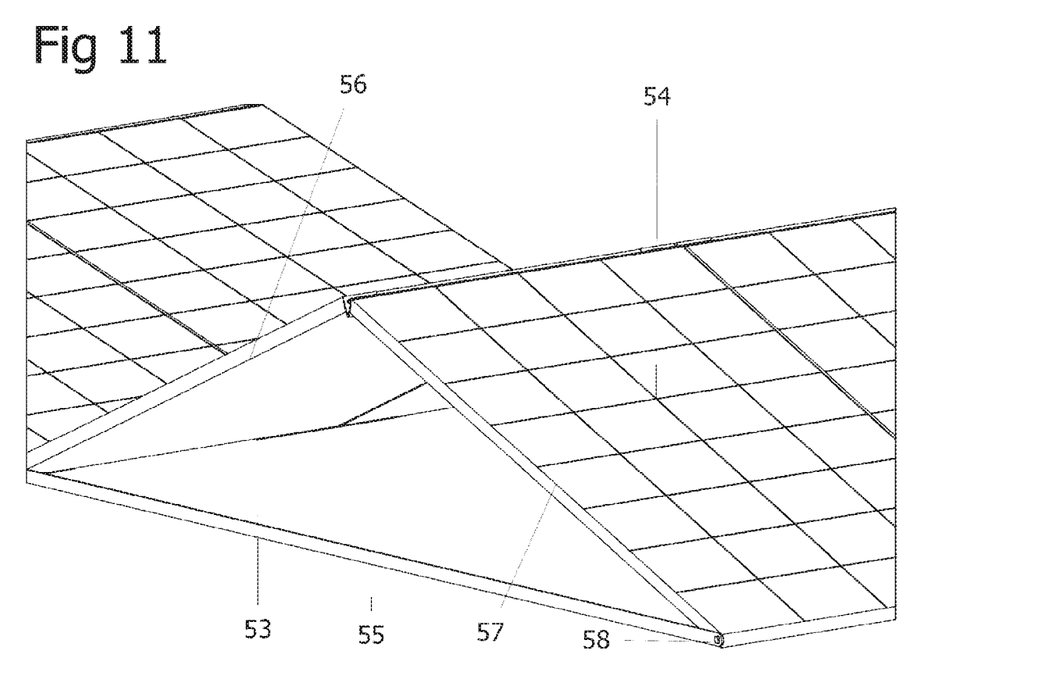
FIG. 11 is a perspective view of a portable PV array in an open condition and showing a flexible connector in a tensioned condition.

FIG. 11 shows a further example of a connection between modules 53 and 54, whereby the flexible connector 55 is a flat connector that is fixed by a bolt 58 to the side edges 56 and 57 of the respective modules 53 and 54. The bolt 58 is thus a connector attached along a free edge of the module 54.

Moreover, as discussed above, the length of the flexible connector between the bars can be adjusted, such as by a screw adjuster, or by a cleat arrangement. However, it is preferred that the length of the flexible connector between the bars be set when the PV array is manufactured, as this removes one element or step of installation when the array is to be employed on site.

The flexible connector shown in the drawings could be metal wire, rope, or a woven fabric. Plastic cord could alternatively be employed, as could other materials or products that meet the requirement for the invention, which is that they must be able to slacken for the PV modules to be folded to the closed condition, and to remain taut and tensioned in the opened condition.

A major feature of the invention is the manner in which the PV modules can be folded into the closed position from the opened position, and then unfolded back to the opened condition. This allows the PV array to be portable and easily installed and removed. Accordingly, FIGS. 2, 3 and 4 show the PV array in the closed condition in which the array can be stored and transported. It will be evident that the compact nature of the array in the closed condition will allow much greater length of array to be stored and transported in a compact condition, and then installed at an installation site to provide significant area for capture of sunlight or electromagnetic radiation. As will be appreciated from the figures, the array 10 can be manufactured and preassembled completely in a manufacturing facility, and in a basic form of the invention, no additional structural material is required when the array is to be opened for use at an installation site. It is expected however, that ballast will be applied to the array 10 after installation, and in the illustrated figures, this can be fixed to the free ends of the bars and can be in the form of sand bags or concrete blocks, or the free ends of the bars can be pegged down.

The PV array can be manufactured with all balance of system components in place, or they can be installed as part of the installation process. The flexible connector 22 maintains the modules in the triangular or east-west configuration that is required, and the preassembly of the flexible connector to the modules means that there is no requirement for the east-west orientation to be set by installation personnel. Rather, it sets automatically when the modules are shifted to the open position. It is to be noted that for installation purposes, wheels or skids such as structural feet, can be attached to the bars 23, 24, 38 and 39.

Figure 6:
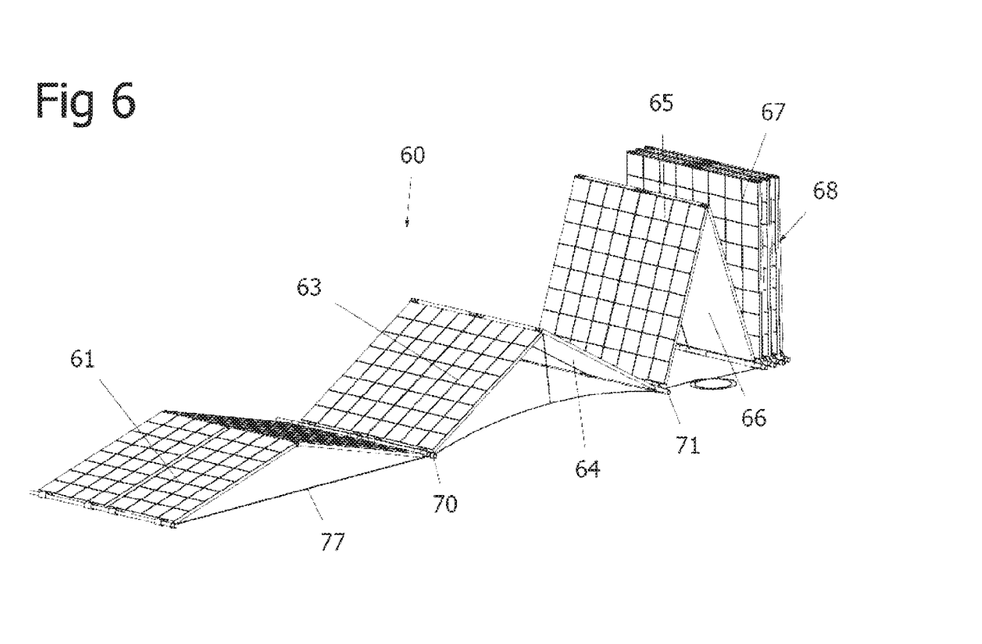
FIGS. 6 to 8 are perspective views from different angles of a further portable PV array shown in a partially installed condition.
Figure 7:
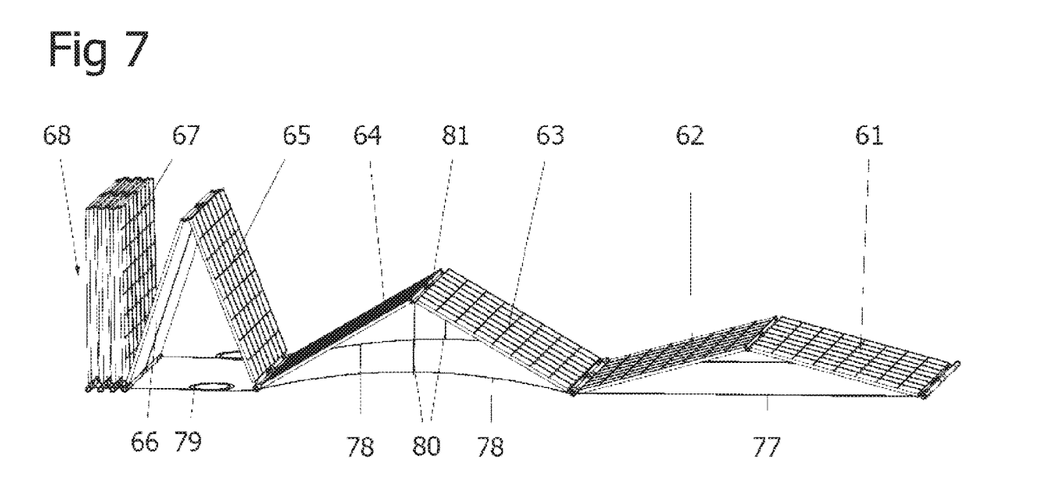
Figure 8:
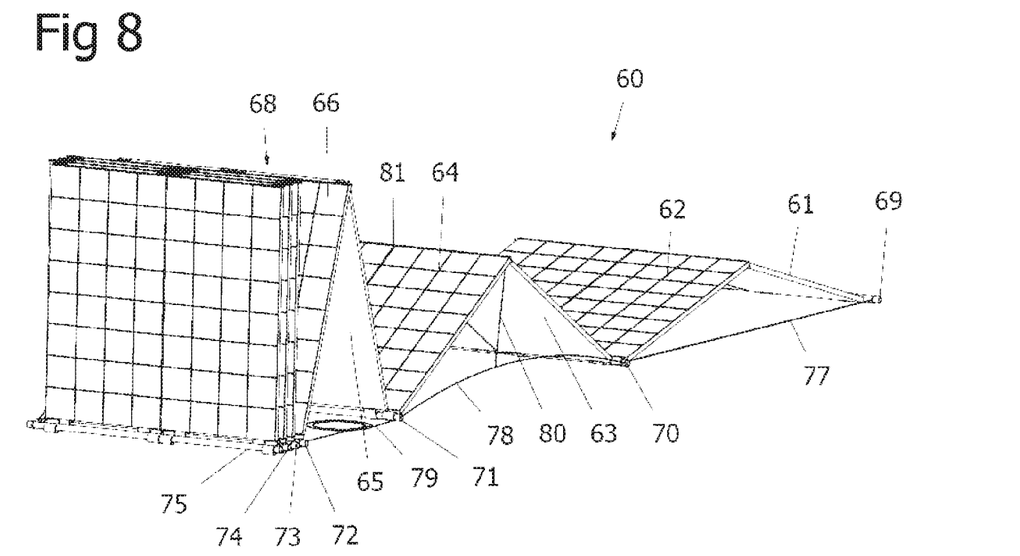

FIGS. 6 to 8 illustrate the array 10 in a partially open condition. In FIGS. 6 to 8, the array 10 has been extended lengthwise, to include a greater number of modules than that shown in FIGS. 1 and 2. This illustrates the flexibility with which additional modules can be included in an array as the power requirements of an installation increase.

In FIGS. 6 to 8, a PV array 60 is shown comprising modules 61 to 67, and further modules 68 in a closed and generally parallel configuration. As with the array 10, the array 60 includes two sets of lengthwise extending rows of modules which are connected laterally or side by side along the bars 69 to 75. What is evident in FIGS. 6 to 8, is that the flexible connector 77 between the modules 61 and 62 is in tension and is therefore taut. However, the connectors 78 and 79 are slack, because the respective modules that those connectors extend between are not yet in the open condition. Again, this is evident from FIGS. 6 to 8, in which the interior angle between the modules 61 and 62 is greater than between the modules 63 and 64 and is greater again than between the modules 65 and 66. The modules 68 are yet to commence shifting to the open position and those modules remain in a generally parallel and close facing relationship.

To install the array 60 (and the array 10, but comment will only be made in relation to the array 60), the array 60 can be lifted from the transport vehicle that has transported the array to the installation site, and the array 60 can thereafter be placed on the installation surface, which might be a roof, or an outdoor stage, or a park etc. Once the array 60 is on the installation surface, the bar 69 can be engaged either manually or with an installation device, and can be pulled away from the stack of PV modules so that the modules 61 and 62 are first shifted from the generally close facing and parallel relationship of the other modules. Importantly and advantageously, given that only two of the modules need to be shifted to commence the opening process, prototypes tested to date show that this can be a manual process. The process can be such that the modules 61 and 62 are taken to the open position before the modules 63 and 64 are moved from the closed condition. This means that the panels can be shifted to the open condition in a controlled manner and the weight that needs to be shifted is that of the modules 61 and 62. As the installation continues the weight that is moved does increase as further modules are released from the closed condition, but again, testing to date has again indicated that a module array of the size shown in FIG. 6 can be opened and closed manually. In this respect, the modules 61 to 68 shown in FIGS. 6 to 8 would have edge or external dimensions of 1 meter×2 meters per module so that with the array 60 fully extended in the open condition, the length of the array would be in the order of 24 meters. In contrast, when the array 60 is in the fully closed condition, the dimensions of the array are in the order of 0.9 meters long×2 meters high×2 meters wide and the weight of the array would be in the region of 800 kg.

The flexible connectors 77, 78 and 79 shown in FIGS. 6 to 8 are shown in the fully extended condition (connector 77), in a still slightly slack condition (connector 78) and in a completely slack condition (connector 79). As an example of how the connectors can be installed, the connector 78 is attached by a spring 80 to the peak 81 between the modules 63 and 64 and that connection can be for example, to a hinge that is positioned at the peak 81. The spring thus extends as the modules 63 and 64 move towards the open condition, and it contracts and lifts the connector 78 as the modules 63 and 64 move to the closed condition. By this arrangement, the connector 78 is neatly stored in the closed condition, but fully able to assume a tensioned state in the opened condition.

Alternative arrangements include clips provided on edges of the modules to which the flexible connector can be secured in the closed condition of the array, while a less permanent arrangement can involve using adhesive to attach the connectors to a surface of the modules when the array is initially assembled and the adhesive will break or shear when the modules are placed in the open condition. That arrangement obviously needs to be replenished each time the modules are returned to the closed condition, but it is a simple step and therefore potentially acceptable.

It has been discussed above that lateral connection of further rows of arrays to side edges of an initial array can broaden the surface area of the array overall. Thus, the figures all show arrays in which a pair of modules are positioned side by side (for example see modules 11 and 40 in FIGS. 1 and 2). Further side additions to the arrays 10 and 60 can be made subject to the ability to transport the arrays. It will be appreciated that the dimensions of an array in the closed condition will increase as the number of modules is added end to end, as well as side to side.

Figure 9:
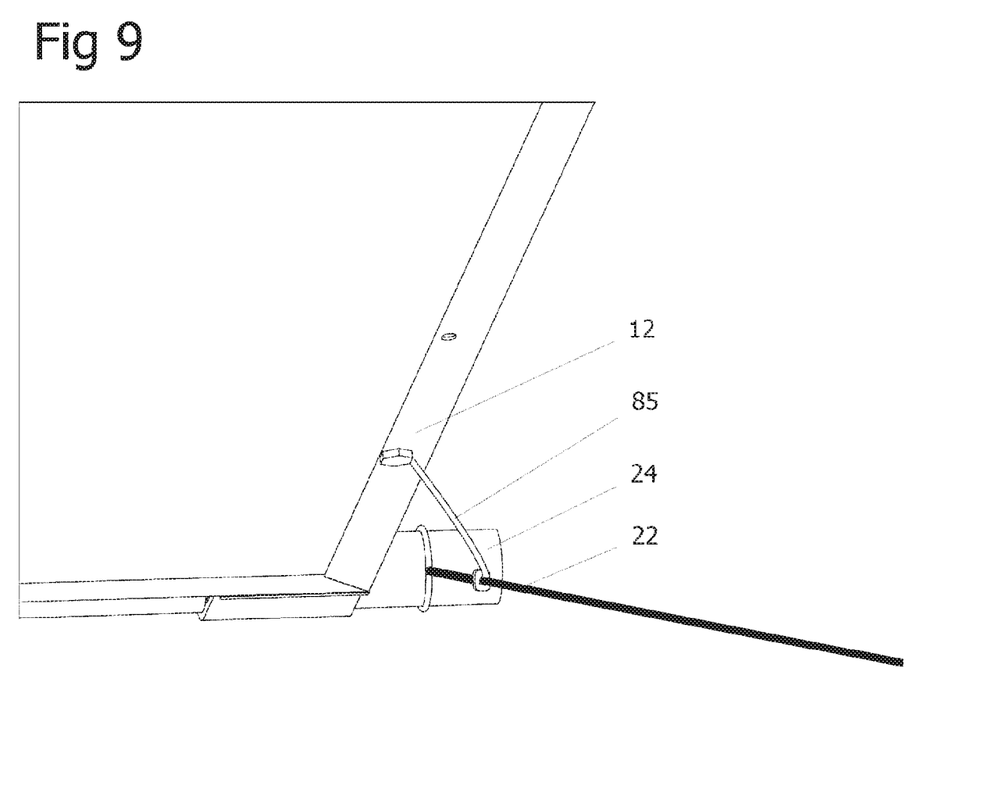
FIG. 9 is a detailed view of an arrangement for earthing a PV module.

FIG. 9 is a view of one corner of the PV module 12 of FIG. 1, and therefore also shows one section of the bar 24. In addition to those features, FIG. 9 shows an earthing cable 85 that extends from the module 12 into connection with the flexible connector 22. In this embodiment, the flexible connector 22 is a conductive connector, such as steel or other metal wire or cable, and therefore the module 12 can be earthed by electrical connection to the connector 22.

Throughout the description and claims of the specification, the word "comprise" and variations of the word, such as "comprising" and "comprises", is not intended to exclude other additives, components, integers or steps.

The invention described herein is susceptible to variations, modifications and/or additions other than those specifically described and it is to be understood that the invention includes all such variations, modifications and/or additions which fall within the spirit and scope of the present disclosure.

The invention claimed is:

1. A portable photo-voltaic (PV) module array comprising:
   at least two planar PV modules which are of generally square or rectangular configuration so that each PV module defines a generally square or rectangular edge of substantially the same dimensions and comprising a pair of substantially parallel end edges and a pair of substantially parallel side edges,
   the PV modules being connected along adjacent end edges and being foldable relative to each other about the connected end edges between a closed condition and an open condition, whereby: in the closed condition, the PV modules are stacked together in a generally parallel and close facing relationship with the edges of the PV modules in general alignment, and
   in the open condition, the PV modules are disposed at an angle to each other so that the PV module array defines triangular configuration, and
   foldable movement of the PV modules from the closed condition to the open condition being prohibited against movement beyond the open condition by a flexible connector that connects with a connection point associated with each of the PV modules of the PV module array, the flexible connector being slack in the closed condition and remaining slack as the PV modules move to the open condition and the flexible connector being tensioned once the PV modules reach the open condition to prohibit movement of the PV modules beyond the open condition.

2. A portable PV module array according to claim 1, the flexible connector being fixed in length between the connection points associated with the PV modules of the PV module array.

3. A portable PV module array according to claim 1, the flexible connector being adjustable.

4. A portable PV module array according to claim 1, the flexible connector being flexible but substantially inextensible.

5. A portable PV module array according to claim 1, the flexible connector being supported in the closed condition so that it is retained relative to the PV modules in a supported condition.

6. A portable PV module array according to claim 5, the flexible connector being supported in the closed condition by a spring arrangement in which a spring is connected to the flexible connector and whereby as the PV modules move to the open condition, the spring extends as the flexible connector is tensioned and as the PV modules are shifted from the open condition to the closed condition, the spring retracts, lifting the flexible connector upwardly and supporting the flexible connector in the closed condition.

7. A portable PV module array according to claim 1, the connection of the PV modules along adjacent end edges being by a flexible plastic, rubber or fabric hinge.

8. A portable PV module array according to claim 1, the connection of the PV modules along adjacent end edges being by rope, cable or chain.

9. A portable PV module array according to claim 1, the connection of the PV modules along adjacent end edges being by a metal hinge which comprises two parts that are separately connected to the facing end edges of adjacent PV modules and a pin that extends between the parts and allows them to pivot relative to one another in a hinging manner.

10. A portable PV module array according to claim 1, the PV array comprising at least four PV modules whereby the PV modules form a series of alternative peaks and troughs.

11. A portable PV module array according to claim 1, the connection points being spaced from the peak of the triangular configuration of the PV modules of the PV array.

12. A portable PV module array according to claim 1, the PV array including at least four PV modules connected in a series of alternating peaks and troughs, and the connection points being made at the troughs of the PV array.

13. A portable PV module array according to claim 1, the connection points being formed on side edges of the PV modules.

14. A portable PV module array according to claim 1, the connection points being formed inboard of side edges of the PV modules.

15. A portable PV module array according to claim 1, the PV array comprising at least two adjacent rows of PV modules formed in a triangular configuration whereby the triangular configuration of the adjacent rows are aligned.

16. A portable PV module array according to claim 15, the flexible connector being operable to prohibit foldable movement of all of the rows of PV modules against movement beyond the open condition.

17. A portable PV module array according to claim 1, the flexible connector being electrically conductive and the PV modules being electrically connected to the flexible connector to earth the PV modules.

18. A method of installing a portable PV module array, the PV module array comprising at least two planar PV modules which are of generally square or rectangular configuration so that each PV module defines a generally square or rectangular edge of substantially the same dimensions and comprising a pair of substantially parallel end edges and a pair of substantially parallel side edges, the PV modules being connected along adjacent end edges and being foldable relative to each other about the connected end edges between a closed condition and an open condition, whereby:

in the closed condition, the PV modules are stacked together in a generally parallel and close facing relationship with the edges of the PV modules in general alignment, and in the open condition, the PV modules are disposed at an angle to each other so that the PV module array defines triangular configuration, and foldable movement of the PV modules from the closed condition to the open condition being prohibited against movement beyond the open condition by a flexible connector that connects with a connection point associated with each of the PV modules of the PV module array, the flexible connector being slack in the closed condition and remaining slack as the PV modules move to the open condition and the flexible connector being tensioned once the PV modules reach the open condition to prohibit movement of the PV modules beyond the open condition, the method comprising the steps of transporting the PV module array to an installation site in the closed condition such that the flexible connector is slack; and moving the PV modules relative to each other, so that the flexible connector moves from slack to tensioned when the PV modules reach the open condition, wherein tensioning of the flexible connector indicates that the PV module array has reached the open condition.

19. A method according to claim 18, the PV module array including at least four PV modules.

20. A method according to claim 19, the method including lifting the PV array in the closed condition onto a surface on which the PV module array is to be installed and shifting the PV modules from closed condition to the open condition, whereby the modules are shifted from one end of the PV module array and move to the open condition progressively from the closed condition.

* * * * *